United States Patent [19]
Eventoff

[11] Patent Number: 5,640,902
[45] Date of Patent: Jun. 24, 1997

[54] SINGLE MOTOR METER DRUM AND SHUTTER BAR DRIVE OF A POSTAGE METER

[75] Inventor: Arnold T. Eventoff, Pleasantville, N.Y.

[73] Assignee: Pitney Bowes Inc., Stamford, Conn.

[21] Appl. No.: 410,424

[22] Filed: Mar. 23, 1995

[51] Int. Cl.⁶ ............................................. B41L 47/46
[52] U.S. Cl. ...................... 101/91; 101/93; 235/101; 400/664
[58] Field of Search .................. 101/91, 93, 45; 235/101; 364/464.03, 464.02; 74/53, 54, 55, 567, 569; 400/664

[56] References Cited

U.S. PATENT DOCUMENTS

| | | | |
|---|---|---|---|
| 4,266,222 | 5/1981 | Eckert et al. | 340/679 |
| 4,302,821 | 11/1981 | Eckert et al. | 340/900 |
| 4,516,494 | 5/1985 | Beck et al. | 101/93.26 |
| 4,731,728 | 3/1988 | Muller | 101/91 |
| 4,774,446 | 9/1988 | Salazar et al. | 318/561 |
| 4,864,505 | 9/1989 | Miller et al. | 364/464.02 |
| 4,922,817 | 5/1990 | Holodnak | 101/91 |
| 4,933,616 | 6/1990 | Chang et al. | 318/561 |
| 5,188,025 | 2/1993 | Murphy, III et al. | 101/91 |
| 5,224,416 | 7/1993 | Malin et al. | 101/91 |
| 5,251,554 | 10/1993 | Eckert, Jr. et al. | 101/91 |
| 5,355,068 | 10/1994 | Eckert, Jr. et al. | 318/282 |

OTHER PUBLICATIONS

"Automated Cam–Mechanism Synthesis and analysis" By: Arnold T. Eventoff; Published in The American Society of Mechanical Engineers; Reprinted From: DE–vol. 46 Mechanism Design and Synthesis; Book No. H00772–1992.

*Primary Examiner*—Christopher A. Bennett
*Attorney, Agent, or Firm*—Ronald Reichman; Melvin J. Scolnick

[57] ABSTRACT

The apparatus of this invention utilizes a cam-driven mechanism to convert a single rotary input driven by a single motor to two or more output motions each having its distinct cycle and profile of motion. This multiplicity of outputs often times requires a separate motor for each output motion. Each distinct cycle of motion is capable of driving its end effector a complete revolution, a fraction of a revolution, multiple revolutions, or a non-integer number of revolutions. Thus, the apparatus of this invention utilizes, a single motor to provide motion to activate the shutter bar mechanism and at the same time, rotate the printing drum of a postage meter one revolution.

8 Claims, 6 Drawing Sheets

SINGLE MOTOR METER DRUM AND SHUTTER BAR DRIVE OF A POSTAGE METER

CROSS REFERENCE TO RELATED APPLICATIONS

Reference is made to commonly assigned copending patent application Ser. No. 08/409,382 now U.S. Pat. No. 3,553,513 filed herewith entitled "Improved Mechanical Motion Transfer Or Indexing Device" in the name of Arnold Eventoff.

FIELD OF THE INVENTION

The invention relates generally to the field of imprinting devices and more particularly to a postal meter imprinting device.

BACKGROUND OF THE INVENTION

Since the issuance of U.S. Pat. No. 1,530,852 to Arthur H. Pitney, Mar. 24, 1925, the postage meter has had a steady evolution. Each meter had a printer included therein on a one-to-one basis, i.e. one metering device and one printing device incorporated into a unit. In postage meters, the need for security is absolute. Such security is applied to postage meters both to the printing portion of the meter and the accounting portion. The reason for the need for absolute security is because a postage meter is printing value, and unless security measures are taken, one would be able to print unauthorized postage, i.e. postage for which no payment is made, thereby defrauding the post office.

Prior art postage meters included an accounting portion, a postal indicia printing portion and a control portion that was coupled to the accounting portion and the printing portion. The accounting portion and the control portion were mechanically secure. They were enclosed in a secure housing so that the critical accounting and control portions can not be tampered with, without rendering such tampering obvious to postal authorities upon inspection.

The printing portion had a printing drum which may incorporate fixed or settable postage. The printing drum was connected to a drive gear which was driven by a first motor. A shutter bar, or other suitable mechanical means coupled thereto prevent rotation of the drive gear, and prevent the printing drum from printing, when the shutter bar is in its closed position. One of the reasons why the shutter bar may prevent the printing drum from printing is that the postage meter does not have sufficient postage to print additional postal indicia. If the postage meter has sufficient postage remaining to print additional postal indicia the control system within the postage meter would release the shutter bar so that it may move to its open position. A solenoid or a second motor was used to move the shutter bar to its open position.

A disadvantage of the foregoing is that two motors or a motor and a solenoid are required to rotate the printing drum and move the shutter bar.

SUMMARY OF THE INVENTION

This invention overcomes the disadvantages of the prior art by utilizing a cam-driven mechanism to convert a single rotary input driven by a single motor to two or more output motions each having its distinct cycle and profile of motion. This multiplicity of outputs oftentimes requires a separate motor or actuator for each output motion. Each distinct cycle of motion is capable of driving its end effector a complete revolution, a fraction of a revolution, multiple revolutions, or a non-integer number of revolutions. Thus, the apparatus of this invention utilizes, a single motor to provide motion to activate the shutter bar mechanism and at the same time, rotate the printing drum of a postage meter one revolution.

An advantage of this invention is that the apparatus of the invention utilizes a single motor and fewer control and drive electronics.

An additional advantage of this invention is that the apparatus of this invention is more reliable by using mechanical coupling.

A further advantage of this invention is that the apparatus of this invention has lower power dissipation, since only one motor is used.

A "cam motor" mechanism converts a single rotary input driven by a single motor to two or more output motions each having its distinct cycle and profile of motion. The "cam motor mechanism" linking the input and output shafts is capable of an infinite variety of motion transfer functions between the input and output shafts. A "cam-motor" or cam-modulated linkage provides the transfer function. This "cam-motor" can simulate the behavior of a servo-motor or other open or closed-loop motor control system.

The cam-motor consists of an output link kinematically suspended to have two degrees of freedom in the x-y plane. One end of this link has a hole that is part of a revloute joint connecting it to a gear or wheel fixed to an output shaft. This output link has two cam followers fastened to it orthogonally positioned around a camshaft. Two cams translate the two followers in such a way that perfectly circular motion is imparted to the revolute joint connecting this link to the output shaft. By deriving the shapes of the two cams, virtually any rotational motion can be given to the output shaft for a given camshaft motion profile. This assemblage of parts comprises the "cam-motor" mechanism.

BRIEF DESCRIPTION OF THE DRAWING

FIG. 6 is a timing diagram of shutter bar 37 displacement vs. time;

DETAILED DESCRIPTION OF THE PREFERRED EMBODIMENT

Figure 1:
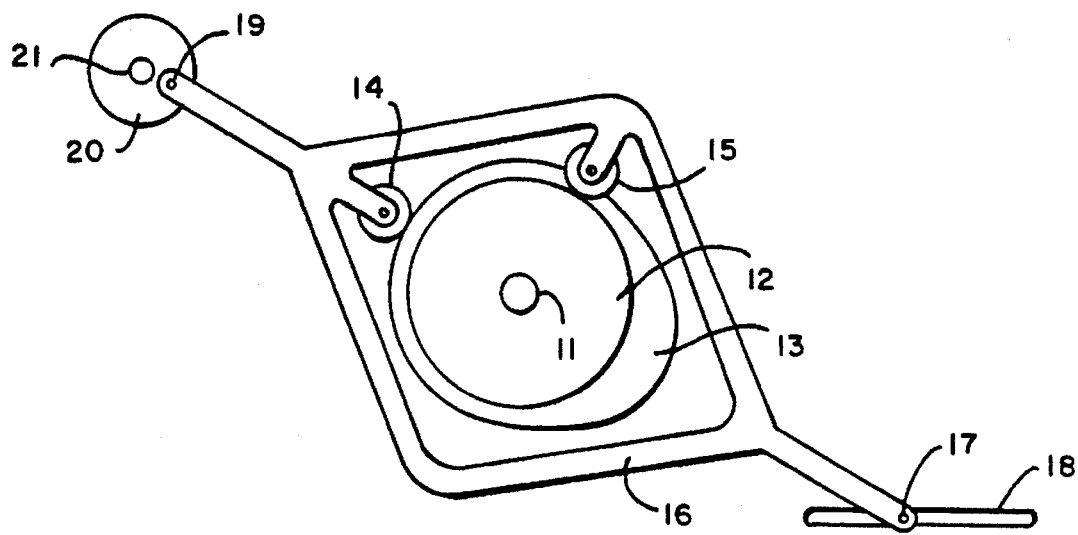
FIG. 1 is a drawing of a "cam motor mechanism" having non-collinear input and output shafts.

Referring now to the drawings in detail, and more particularly to FIG. 1, the reference character 11 represents an input shaft. Input shaft 11 also serves as a camshaft and hence is coupled to cams 12 and 13. Cam 12 operates cam follower 15 and cam 13 operates cam follower 14. Cam followers 14 and 15 are fastened to output link 16. It would be obvious to one skilled in the art of cam design that various means may be utilized to insure that cam followers remain on the surfaces of their respective cams. For example, 1) a spring strategically placed between the output link 16 and ground or, 2) two additional conjugate cams having mating (spring loaded) cam followers also mounted to the output link.

A pin 17 is connected to output link 16. Pin 17 engages grounded slot 18, which is at an appropriate angular orientation. A revolute joint 19 connects output wheel 20 to output link 16. An output shaft 21 is concentrically fixed to output wheel 20.

Cams 12 and 13 must be shaped to provide a) in the xy space domain: that revolute joint 19 moves in a perfectly circular path to insure that joint 19 provides rotary motion to output wheel 20; and b) in the time domain: the specified angular positions of output wheel 20 as a function of time are obtained. In addition the shapes of cams 12 and 13 are dependent upon the time dependent angular position of input shaft 11. There are several methods in which cams 12 and 13 may be specially shaped for particular purposes. An example of one method is described in "Automated Cam-Mechanism Synthesis and Analysis", by the inventor hereof, The American Society of Mechanical Engineers, DE-Vol 64 1992, incorporated herein by reference.

Figure 2:
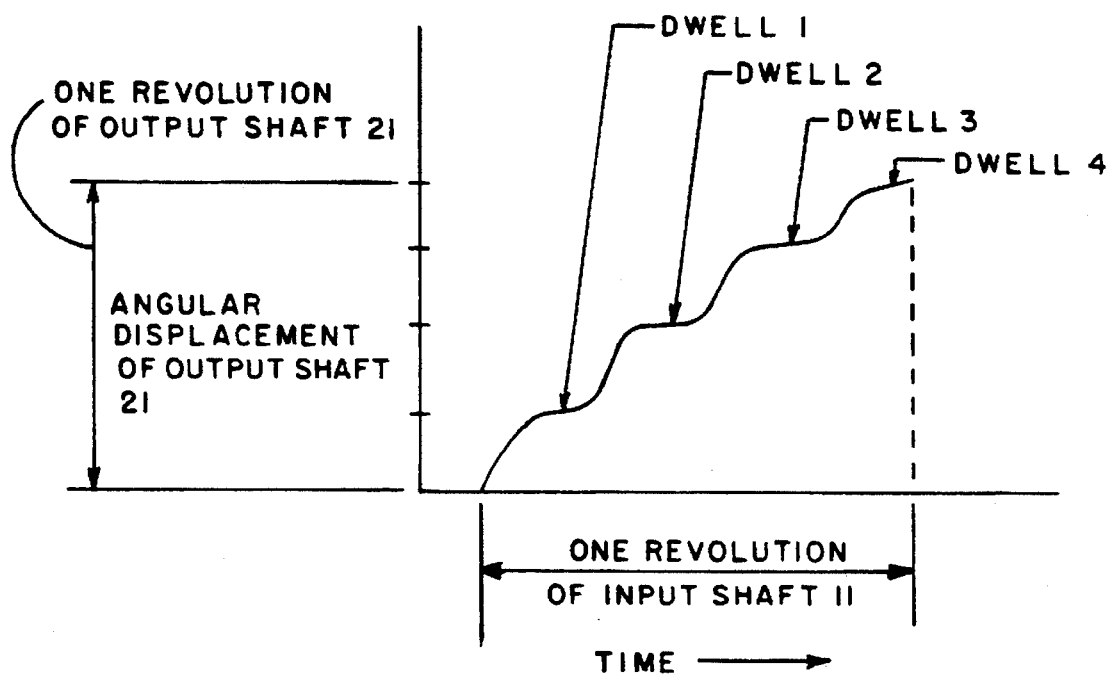
FIG. 2 is a timing diagram of the output shaft 21 motion vs. input shaft 11 motion for one revolution of input shaft 11 of FIG. 1.

FIG. 2 is one example of a possible timing diagram of output shaft 21 vs, input shaft 11 for one revolution of input shaft 11 of FIG. 1, for relatively simple indexing motion. For one revolution of input shaft 11, output shaft 21 completes one revolution but experiences four periods of movement and four periods of dwell.

The above diagram shows relatively equal increments of motion and relatively equal dwells. In this simple example input shaft 11 has a constant velocity. However, those skilled in the art can specify any convenient dwell time and any convenient displacement profile between dwells i.e., higher order polynomial motion can be specified to completely eliminate jerk for any or all motions between dwells, or lower quality motion (e.g. cycoidal or harmonic) cycoidal motion can be specified yielding finite (or infinite) jerk, but having the benefit of lower peak accelerations for any or all motion profiles. Because cam shapes 12 and 13 are derived as a function of desired output motions as well as the specified input motion or shaft 11, many combinations of output motions are possible. If a more complex camshaft motion is required, the cam shapes would account for this variation while preserving the desired output using the cam shaping method described hereinbefore.

Figure 3:
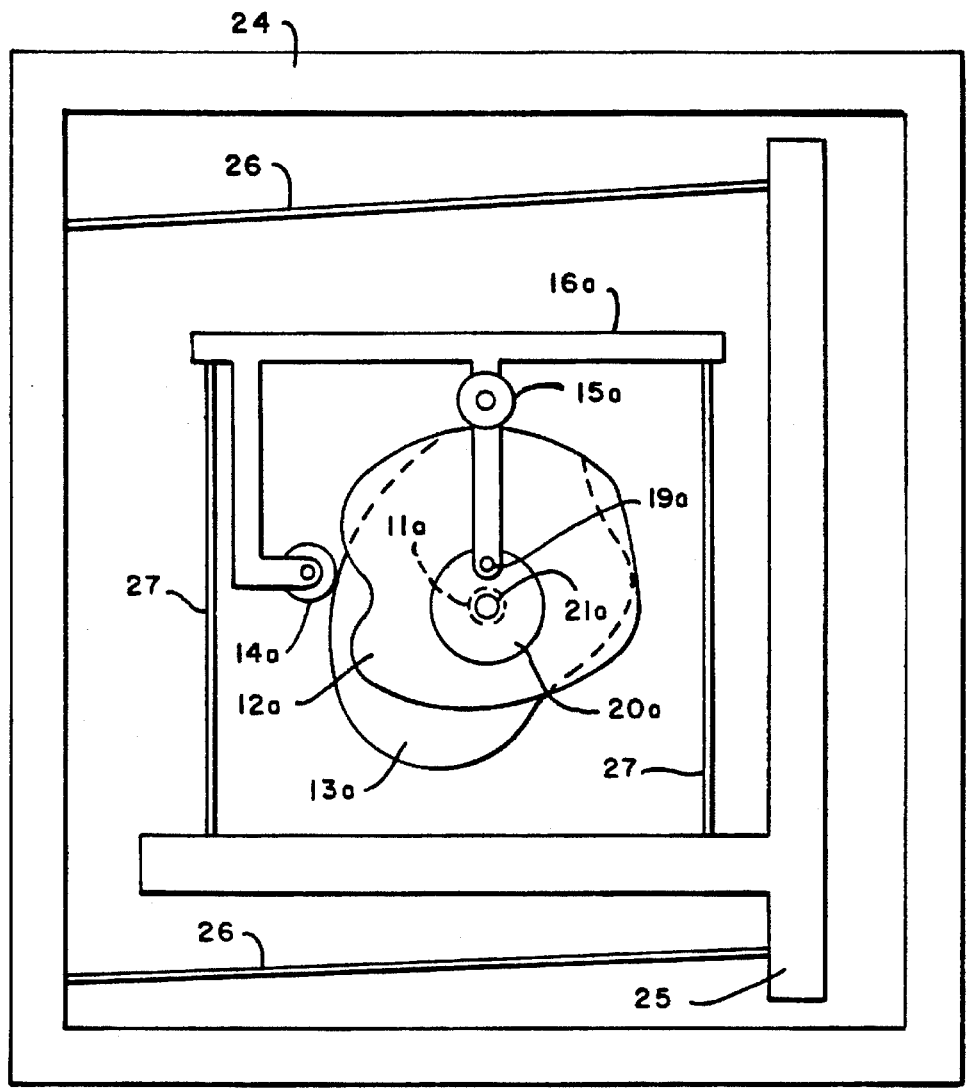
FIG. 3 is a drawing of a "cam motor mechanism" having collinear input and output shafts.

FIG. 3 is a drawing of the apparatus of this invention having collinear input and output shafts. Input shaft 11a also serves as a cam shaft. Input shaft 11a is coupled to cams 12a and 13a. Cam 12a operates cam follower 15a and cam 13a operates cam follower 14a. Cam followers 14a and 15a are coupled to output link 16a. It would be obvious to one skilled in the art of cam design that various means may be utilized to insure that cam followers respectfully remain on the surfaces of cams. For example a spring strategically placed between the output link 16a and ground or two additional conjugate cams having mating (spring loaded) cam followers also mounted to the output link. Output link 16a is coupled to output wheel 20a by revolute joint 19a, or any known fastening means.

An output shaft 21a is concentrically fixed to output wheel 20a. Cams 12a and 13a must be shaped to provide a) in the xy space domain that revolute joint 19a moves in a perfectly circular path to insure that joint 19a provides rotary motion to output wheel 20a; and b) in the time domain the specified angular positions of output wheel 20a as a function of time are obtained. In addition the shapes of cams 12a and 13a are dependent upon the time dependent angular position of input shaft 11a. There are several methods in which cams 12a and 13a may be specially shaped for particular purposes. An example of one method is described in "Automated Cam-Mechanism Synthesis and Analysis", by the inventor hereof, The American Society of Mechanical Engineers, DE-Vol 64 1992, herein incorporated by reference.

Flexure pair 26 is coupled to output carrier link 25 and housing 24. Housing 24 is stationary in order to provide frictionless parallel motion in essentially the vertical direction to output carrier link 25. Flexure pair 27 connects output link 16a to output carrier link 25 and provides parallel motion in essentially a horizontal direction to output link 16a relative to output carrier link 25. The foregoing arrangement maintains parallelism between output link 16a and stationary housing 24 and allows it to have two degrees of freedom in the X-Y plane.

An advantage of flexure pairs 26 and 27 is that they provide frictionless suspension to supported members. A further advantage is that flexure pairs 26 and 27 can be designed to provide a spring loaded biasing force between cam followers 14a and 15a and respective cams 13a and 12a. Thereby, insuring that cam followers 14a and 15a remain on cam surfaces 13a and 12a thereby, eliminating backlash. With the above arrangement additional cam follower springs would not be necessary.

It would be obvious to one skilled in the art that circular motion at joint 19a may be obtained by numerous forms of cam modulated linkages. For example, a different embodiment of FIG. 3 may have four bar linkages instead of flexure pairs 26. Furthermore, output link 16 a need not maintain parallel motion to accomplish the above. One skilled in the art would be able to develop several varieties of cam modulated linkages not limited to parallel motion.

Figure 4:
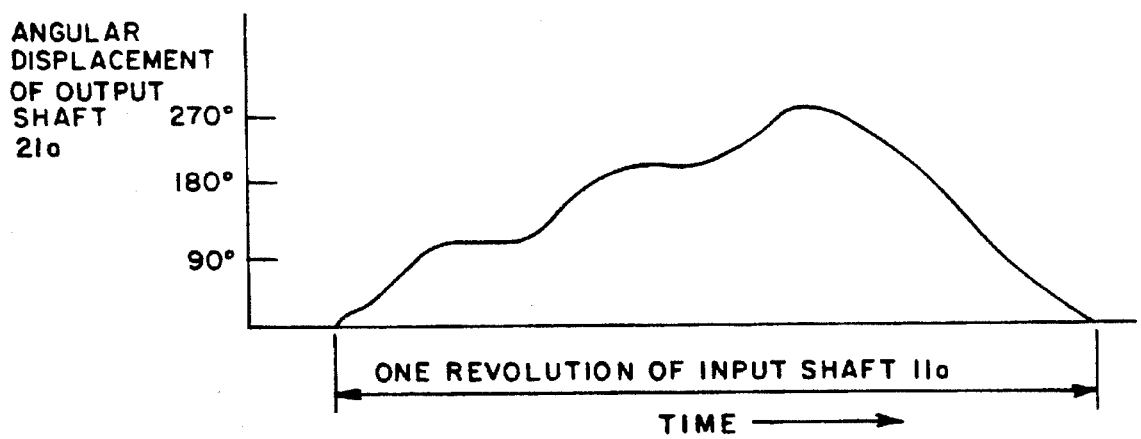
FIG. 4 is a timing diagram of output shaft 21a motion vs. input shaft 11a motion.

FIG. 4 is a timing diagram of output shaft 21a motion vs. input shaft 11a motion of FIG. 3. Input shaft 11a and output shaft 21a are shown at rest at a home dwell. The first movement of input shaft 11a causes an angular movement of 90 degrees by output shaft 21a and a first dwell. The second movement of input shaft 11a causes output shaft 21a to rotate to 180 degrees and the second dwell. The third movement of input shaft 11a causes output shaft 21a to rotate to 270 degrees the maximum amplitude it experiences in a counter-clock wise direction where it immediately reverses direction and is displaced clockwise back to its home position. The shapes shown on cams 12a and 13a have been synthesized to satisfy the above mentioned motion profile. It would be obvious to one skilled in the art that cams 12a and 13a may be specifically shaped to provide numerous varieties of output motion profiles.

Figure 5:
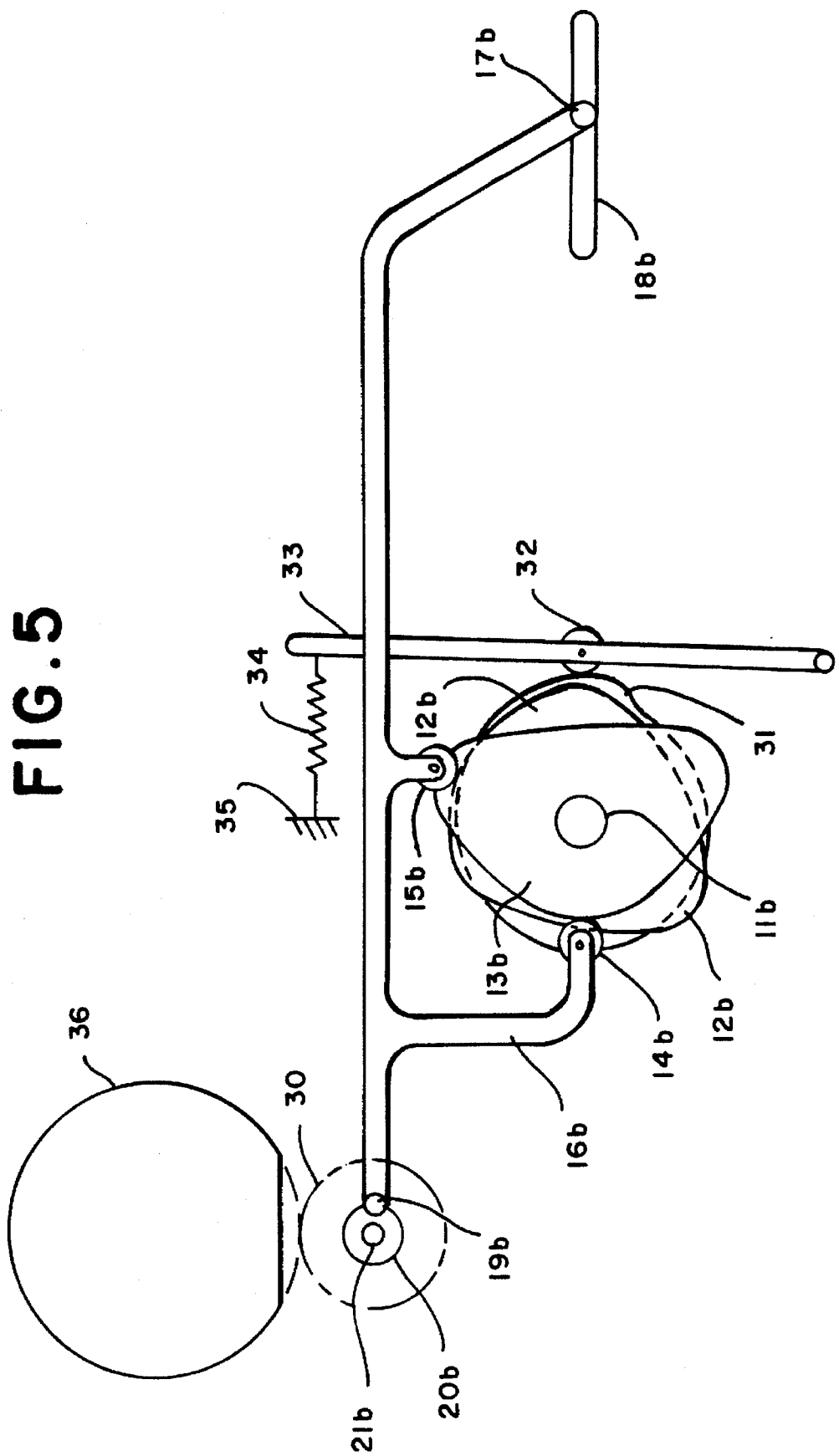
FIG. 5 is a drawing of a "cam motor mechanism" being utilized to drive a printing drum and shutter bar of a postage meter.

FIG. 5 is a drawing of a "cam motor mechanism" being utilized to drive both a printing drum and shutter bar of a postage meter. The "cam motor mechanism" consists of a input shaft 11b. Input shaft 11b also serves as a camshaft which is driven by a drive motor (not shown). Camshaft 11b is coupled to cams 12b and 13b. Cam 12b operates cam follower 15b and cam 13b operates cam follower 14b. Cam followers 14b and 15b are fastened to output link 16b. Output link 16b provides two degrees of freedom planar motion (derived from cam followers 14b and 15b). Cam 12b provides vertical motion to output link 16b and cam 13b provides horizontal motion to output link 16b. This two degrees of freedom of motion precisely traces out a circular path of a portion of, one, or several revolutions. The end of output link 16b is attached to output wheel 20b by a revolute joint 19b. Revolute joint 19b also connects output wheel 20b to drum drive gear 30. Output wheel 20b is connected to output shaft 21b. The rotary motion can be any portion of or any multiple of a complete revolution and is obtained for a single input rotation of camshaft 11b. Drum drive gear 30 turns meter drum 36. When drum drive gear 30 rotates twice meter drum 36 rotates once and prints one postal indicia on a mailpiece (not shown).

Camshaft 11b is also coupled to shutter bar cam 31. Cam 31 operates cam follower 32. Cam follower 32 is fastened to shutter bar actuator link 33. Spring 34 connects shutter bar actuator link 33 to ground 34. A pin 17b is connected to output link 16b. Pin 17b engages grounded slot 18b, which is at an appropriate angular orientation.

FIG. 6A–6D show the coupling of the cam motor mechanism and its essential elements.

Figure 6A:
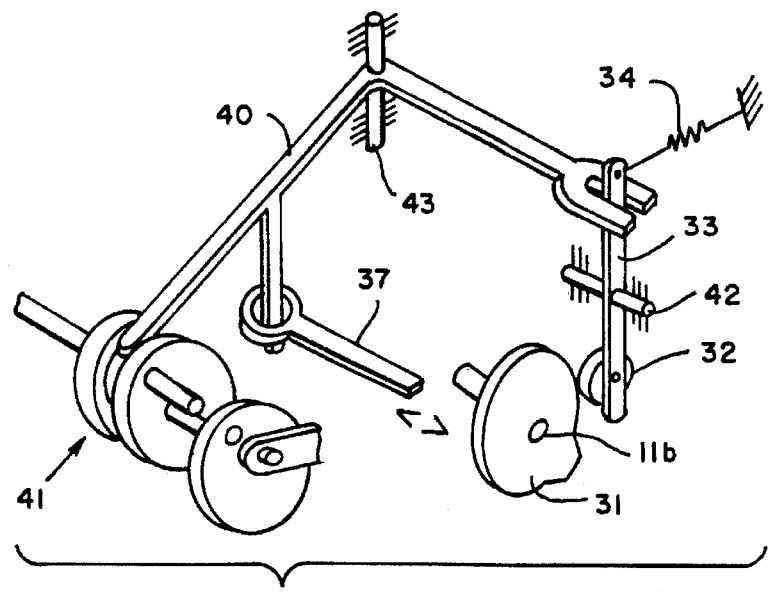
FIG. 6A is a drawing of a "cam-motor mechanism", shutter bar 37 and shutter link 33 showing the coupling.
Figure 6B:
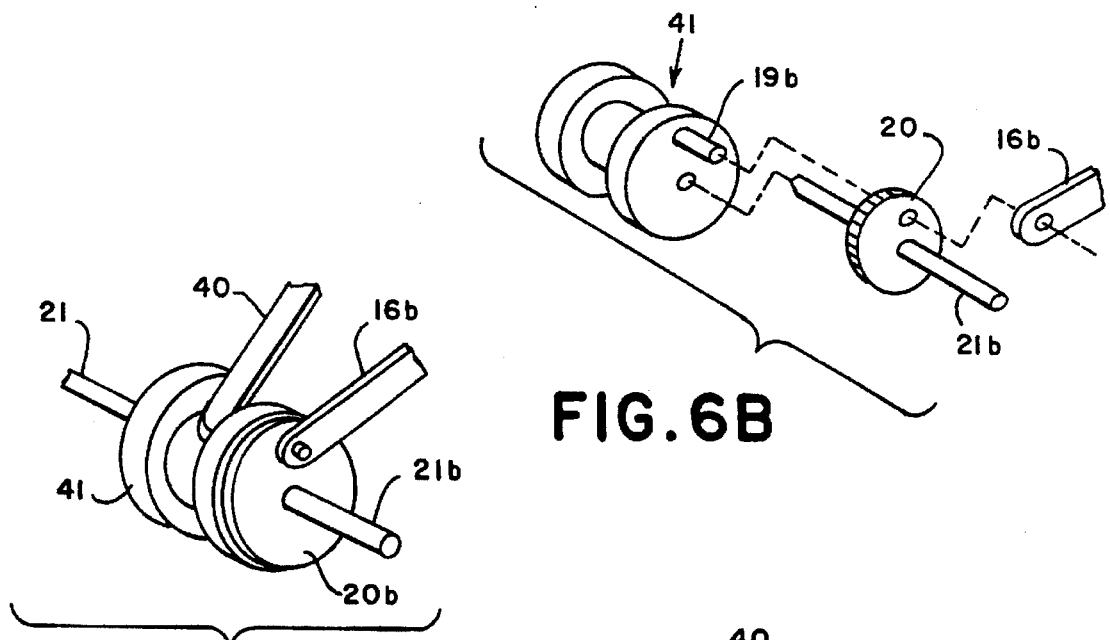
FIG. 6B is an exploded view showing output wheel 20b, coupler wheel 41, and output link 16b.
Figure 6C:
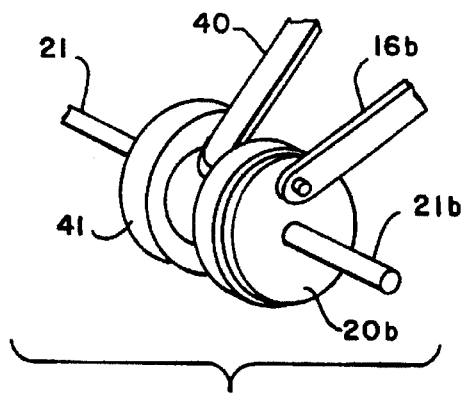
FIG. 6C is a drawing showing the components of FIG. 6B in a coupled state positioned by link 40.
Figure 6D:
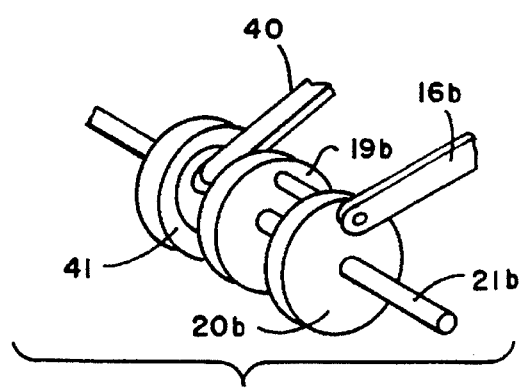
FIG. 6D is a drawing showing the components of FIG. 6B in an uncoupled state positioned by link 40.

FIG. 6A shows a schematic of one of numerous ways to determine whether the drum rotates or remains stationary for one revolution of the input camshaft. The shutter link cam 31 is fixed to the camshaft 11b (for clarity, the two cam-motor cams, 12B and 13B are not shown) and operates follower 32 which is connected to the shutter link 33. Shutter link 33 is biased clockwise by spring 34 thereby attempting to cause follower 32 to contact the surface of cam 31. Shutter link 33 is linked to intermediate couling link 40 in such a way that when follower 32 moves toward the right, the intermediate coupling link 40 rotates clockwise (as viewed from the top) about pivot 43. The leftmost end of 1C link 40 engages an annular slot in coupler wheel 41. FIG. 6B is an exploded view of ouptut link 16B, output wheel 20B, output shaft 21B, coupler wheel 41. Coupler wheel 41 has a central hole that has a slide fit over output shaft 21. When 1C link 40 pivots about pivot 43, the coupler wheel is forced to slide axially along output shaft 21. If it slides toward the right, it is positioned such that coupling pin 19B (fixed to 41) protrudes through a hole in output gear 20 and into the hole in output link 16B thereby coupling output link 16B to output gear 20. FIGS. 16C and 16D show both the coupled and uncoupled positions of coupler wheel 41. Since output gear 20 is fixed to output shaft 21, when the output link is modulated by the two cam-motor cams to rotate coupling pin 19B, all three members (20, 21, & 41 ) rotate together. The annular groove in the coupler wheel is held in its axial positon by stationary 1C link 40 as the coupler wheel rotates.

Also attached to the 1C link 40 is a connection to shutter bar 37 housed partially within the print drum (not shown) and controlled by the postage funds security mechanism (also not shown). FIG. 6A shows the shutter bar 37 in its locked position (as is the case where sufficient postage is not available). In this mode, it is inhibited from moving toward the right by means of the durm security mechanism. Because of this, the intermediate coupling link 40 is held in its most clockwise position in spite of spring 34 trying to rotate 1C link 40 in its most counter-clockwide position. As a consequence:

1. The shutter link 33 is forced to remain in its most counter-clockwise position and follower 32 is prevented from fully following the surface of cam 31.
2. The coupler link is forced to its uncoupled position (FIG. 6C).
3. Because of 2 above, the coupling pin 19B does not engage output link 16B and as a result, when output link 16B rotates, it does not rotate output gear 20 along with it.

The resulting motion for the "no funds" case would be as follows: the "cam motor mechanism" still rotates output link 16b twice, output wheel 20b remains stationary and is held in position by locked meter drum 36. Shutter bar actuator 33 remains in its most counter-clockwise position and does not allow cam follower 32 to ride on cam 31.

When the shutter bar 37 is allowed to rotate clockwise (as is the case when there is sufficient postage funds available), spring 34 is allowed to contract and consequently:

1. Follower 32 can follow the cam surface and is thereby displaced.
2. The coupler wheel 41 can slide along shaft 21 and coupling pin 19B engages the hole in cam-motor link 16B thereby coupling 16B to output gear 20.
3. The output gear 20 is forced to rotate with the cam-motor link 16 and hence the drum will rotate its full cycle.

The output motion of output link 16b is not limited to just circular motion. Output link 16b can be provide non-circular motion for specific end-effectors or mechanisms. Another advantage of the "cam motor mechanism" is that the circular (or non-circular) motion imparted to output link 16b need not start precisely when camshaft 11b begins rotating. There can be a dwell at the start and termination of the cycle of camshaft 11b, through which no motion of output link 16b takes place. In this manner, the accelerating and decelerating portion of the camshaft 11b motion need not be coupled to the output link 16b motions. In this mode of operation, only when camshaft 11b speed is not in a transient mode will the input motion be transformed to the desired output motion. In this way, higher quality output motion control is attained for a relatively low quality input motion, such as, for example that supplied by an open-loop D.C. motor starting at and returning to home position with nonlinear velocity profiles.

The result of the above cam motor mechanism approach and its inherent capability to provide a dwell at any portion of any of its input or output motions is that several output functions can be performed by a single camshaft revolution. In the embodiment described herein, the single camshaft 11b revolution driven by a single motor (not shown) accomplishes two functions:

1. From two cams 14b and 15b each operating a respective cam follower 13b and 12b on a single output link 16b, circular motion in the form of two complete revolutions is given to the end of output link 16b that is pinned to a drum drive gear 30 having ½ the diameter of the meter drum 36. The resulting output motion is one complete revolution of the drum 36 for every two revolutions of the drum drive gear 30.

2. A third cam 31 mounted to the same camshaft 11b provides the rise, dwell, and fall motion for shutter bar cam 31. Both motions (drum 36 and shutter bar actuator link 33) are obtained from a single revolution of camshaft 11b and from a single motor (not shown). With the computerized cam synthesis method hereinbefore mentioned to develop the cam shapes, almost any desired motion profile can be provided to each output (in this case, the drum 36 motion and the shutter bar actuator link 33 motion). In the example described here, cycloidal motion is synthesized into the cam shapes for both drum 36 and shutter bar actuator link 33 output motions.

Depending on the particular mechanism and the particular drive ratios chosen (between the shaft driven by output link 16b and the final output shaft), the "cam motor mechanism" can be synthesized to provide almost any number of revolutions of output motion. For example, if drum 36 was three times the diameter of the drum drive gear 30, output link 16b on the "cam motor mechanism" would be synthesized to provide three full revolutions to drum drive gear 30. If the ratio were one to one, output link 16b would rotate just once.

Through a suitable drive ratio from drum drive gear 30 driven by output link 16b to the final output gear or pulley, a variety of output amplitudes can be obtained (either greater or less than the synthesized number of revolutions of output link 16b). A general requirement of the "cam motor mechanism" is that its output link 16b rotate an integral number of revolutions. For non-circular output link motion, output link 16b must return to its home position when camshaft 11b has cycled back to its home position (at the completion of a full camshaft cycle.) This is necessary so at the start of a new cycle, output link 11b begins at its home position relative to the cam home position.

Camshaft 11b may also be displaced an integer multiple of revolutions to define a complete cycle of motion. For example, five camshaft revolutions could be defined as one "cam motor mechanism" cycle. A consequence of this implementation is that any dwells on camshaft 11b will be repeated each revolution.

Defining one complete camshaft 11b revolution as a complete cycle eliminates this consequence.

Figure 7:
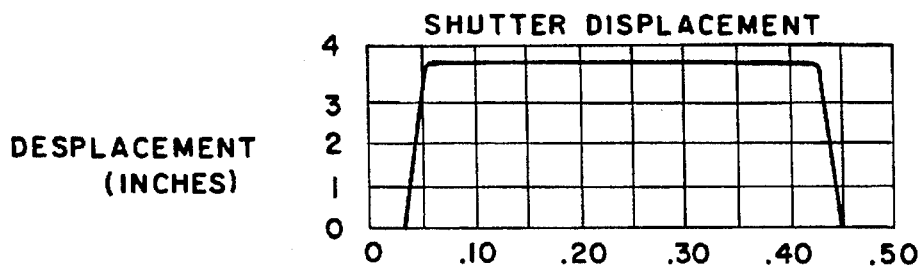
FIG. 7 is a timing diagram of shutter bar 37 displacement VS time.

FIG. 7 is a timing diagram of shutter bar 37 displacement vs. time.

Figure 8:
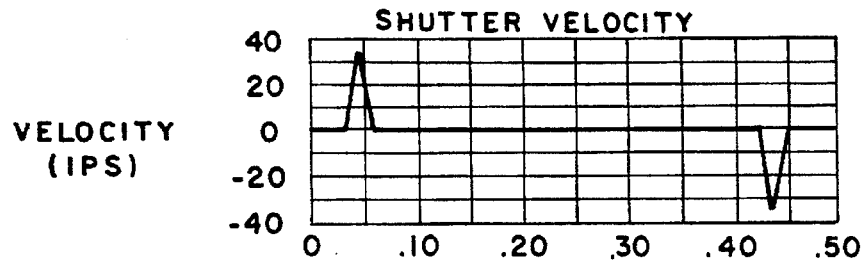
FIG. 8 is a timing diagram of shutter bar 37 velocity vs. time.

FIG. 8 is a timing diagram of shutter bar 37 velocity vs. time.

Figure 9:
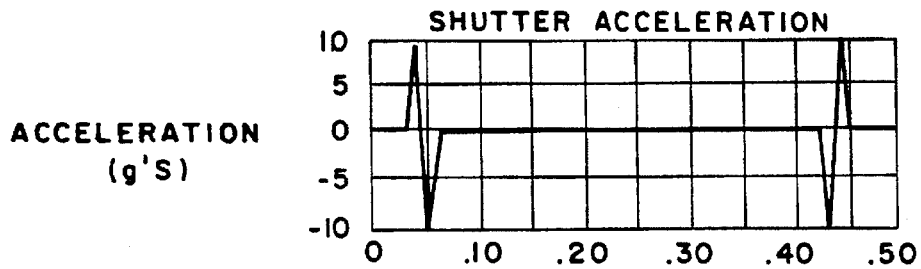
FIG. 9 is a timing diagram of shutter bar 37 acceleration vs. time.

FIG. 9 is a timing diagram of shutter bar 37 acceleration vs. time.

Figure 10:
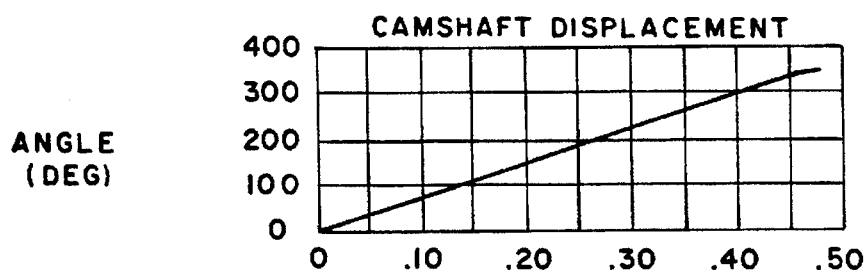
FIG. 10 is a timing diagram of camshaft 11b displacement vs. time.

FIG. 10 is a timing diagram of camshaft 11b displacement vs. time.

Figure 11:
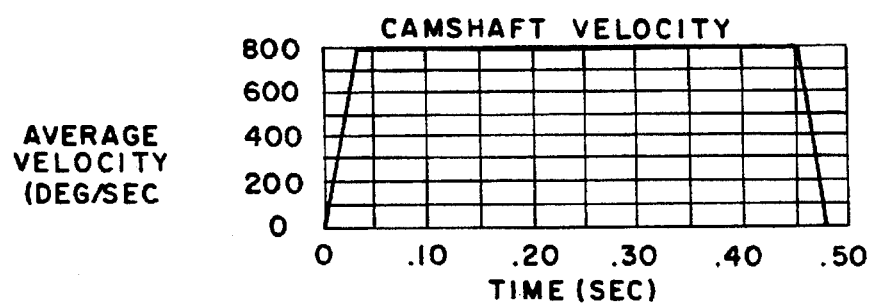
FIG. 11 is a timing diagram of camshaft 11b velocity vs. time.

FIG. 11 is a timing diagram of camshaft 11b velocity vs. time.

Figure 12:
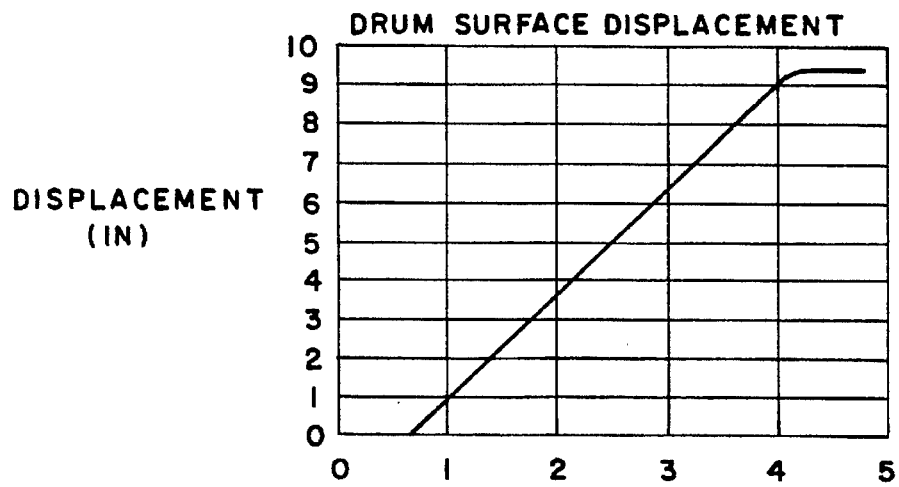
FIG. 12 is a timing diagram of meter drum 36 surface displacement vs. time.

FIG. 12 is a timing diagram of meter drum 36 surface displacement vs. time.

Figure 13:
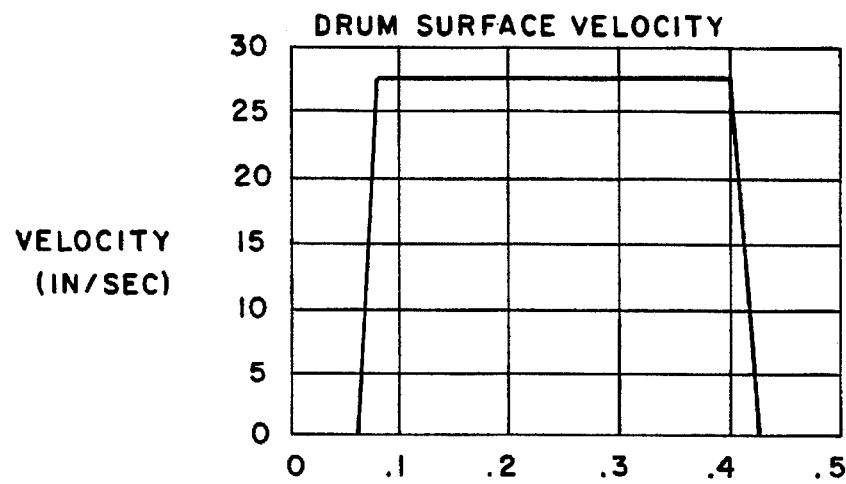
FIG. 13 is a timing diagram of meter drum 36 surface velocity vs. time.

FIG. 13 is a timing diagram of meter drum 36 surface velocity vs. time.

Figure 14:
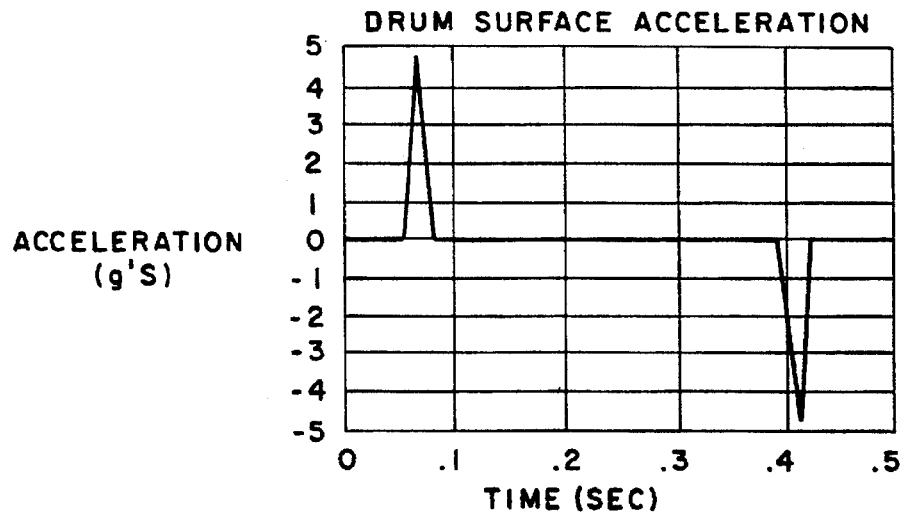
FIG. 14 is a timing diagram of meter drum 36 surface acceleration vs. time.

FIG. 14 is a timing diagram of meter drum 36 surface acceleration vs. time.

The above specification describes a new and improved mechanical motion transfer or indexing device being used to drive a printing drum and shutter bar of a postage meter. It is realized that the above description may indicate to those skilled in the art additional ways in which the principles of this invention may be used without departing from the spirit. It is, therefore, intended that this invention be limited only by the scope of the appended claims.

What is claimed is:

1. A linkage device for coupling an input shaft with an output shaft, said device comprising:

a drum that is coupled to the output shaft; a first member that is coupled to said drum;

a first cam follower;

a first cam that is coupled to said first cam follower, said first cam is connected to the input shaft;

a second cam follower;

a second cam that is coupled to said second cam follower, said second cam is connected to the input shaft;

a third cam follower;

a third cam that is coupled to said third cam follower;

a second member that is connected to the first member and said third cam follower, said third cam is shaped to force said second member to trace out a path causing said first member not to be engaged with the drum; and an output link that is connected to said first and second cam followers and the output shaft, said first and second cams are shaped to force said output link to trace out a circular path causing said output link to rotate the output shaft.

2. The linkage device claimed in claim 1, wherein the first member is a shutter bar of a postage meter that prevents the drum from rotating and printing a postal indicia when the shutter bar engages the drum.

3. The linkage device claimed in claim 2, wherein said second member is a shutter bar actuator.

4. The linkage device claimed in claim 3, further including means for restraining said output link, said restraining means is coupled to said actuator and ground.

5. The linkage device claimed in claim 1, wherein said first and second cams are shaped to provide specific time dependent displacement profiles for the output shaft given a specific input shaft motion.

6. The linkage device claimed in claim 1, wherein said third cam is shaped to provide specific time dependent displacement profiles for the first member given a specific input shaft motion.

7. The linkage device claimed in claim 1, wherein the input and output shafts are not colinear.

8. The linkage device claimed in claim 1, further including:

a housing containing the linkage device;

a output carrier link;

a first pair of flexures that is connected to said output link and said housing; and a second pair of flexures that is connected to said output carrier link to provide a frictionless suspension to the output link.

* * * * *